(No Model.) 5 Sheets—Sheet 1.
J. G. HODGSON.
MACHINE FOR SOLDERING VENT HOLES IN CAN CAPS.
No. 436,785. Patented Sept. 23, 1890.
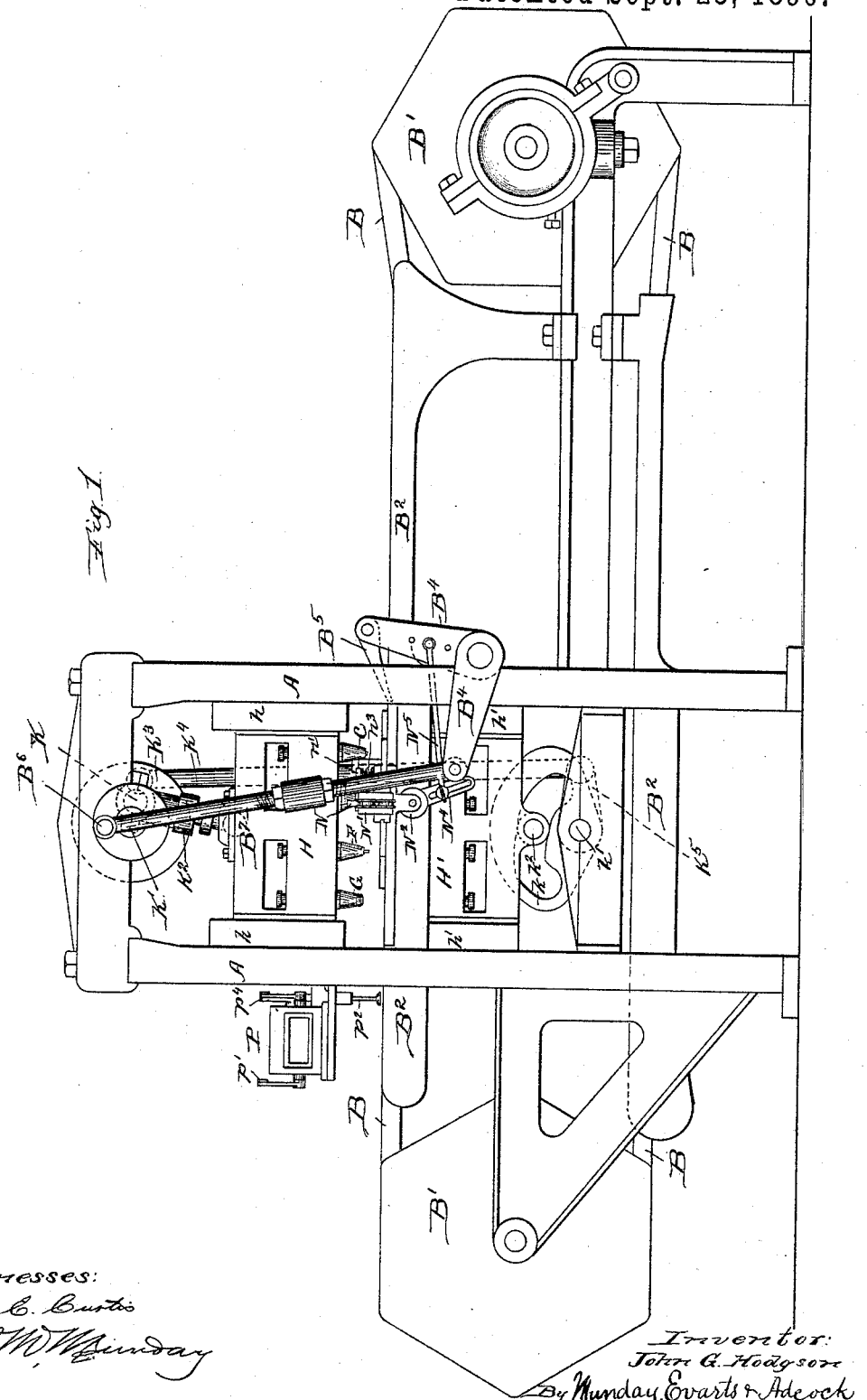
Witnesses:
Geo. C. Curtis
H. W. Munday
Inventor:
John G. Hodgson
By Munday, Evarts & Adcock
his Atty's (No Model.) 5 Sheets—Sheet 2.
J. G. HODGSON.
MACHINE FOR SOLDERING VENT HOLES IN CAN CAPS.
No. 436,785. Patented Sept. 23, 1890.
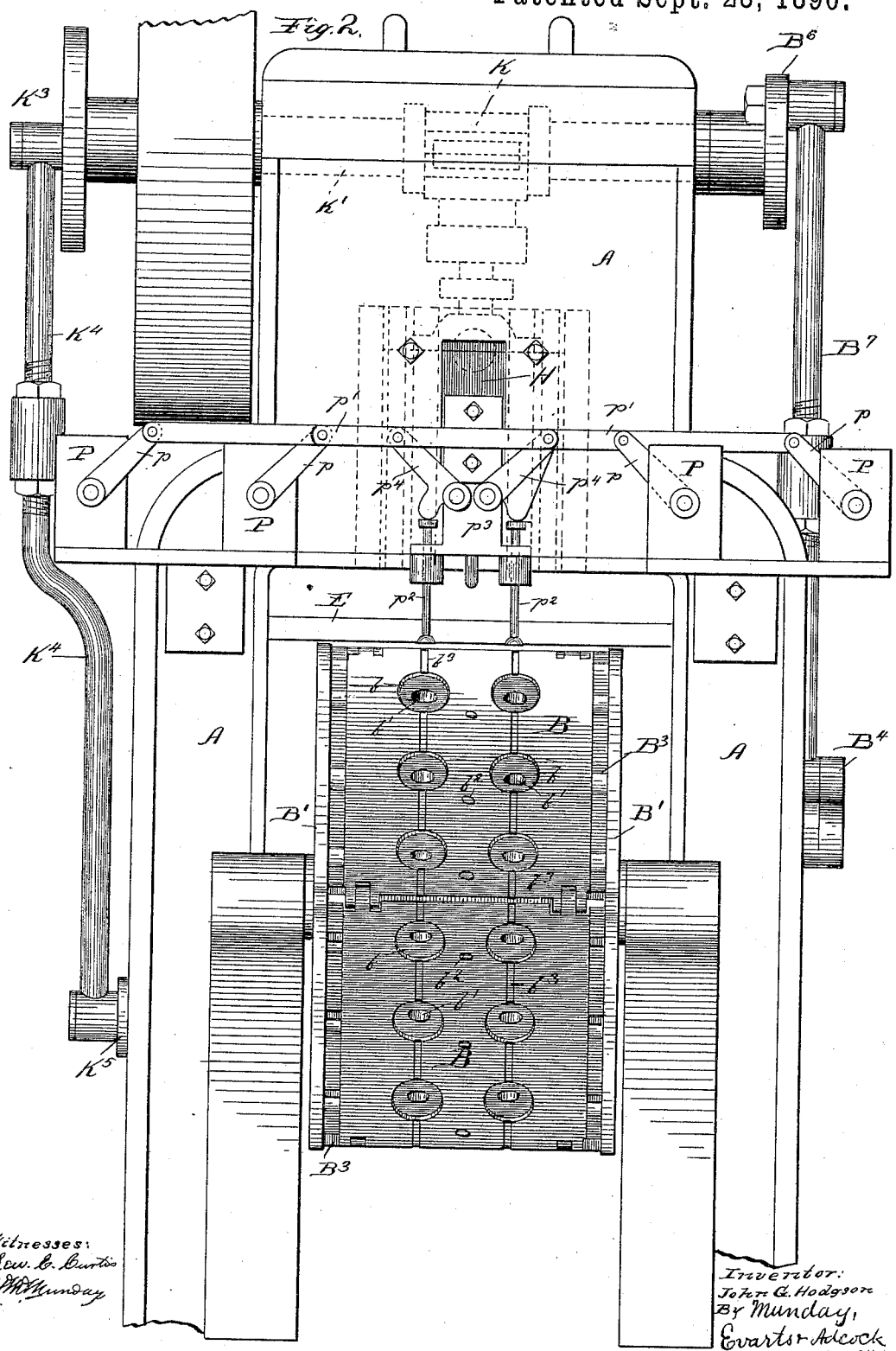

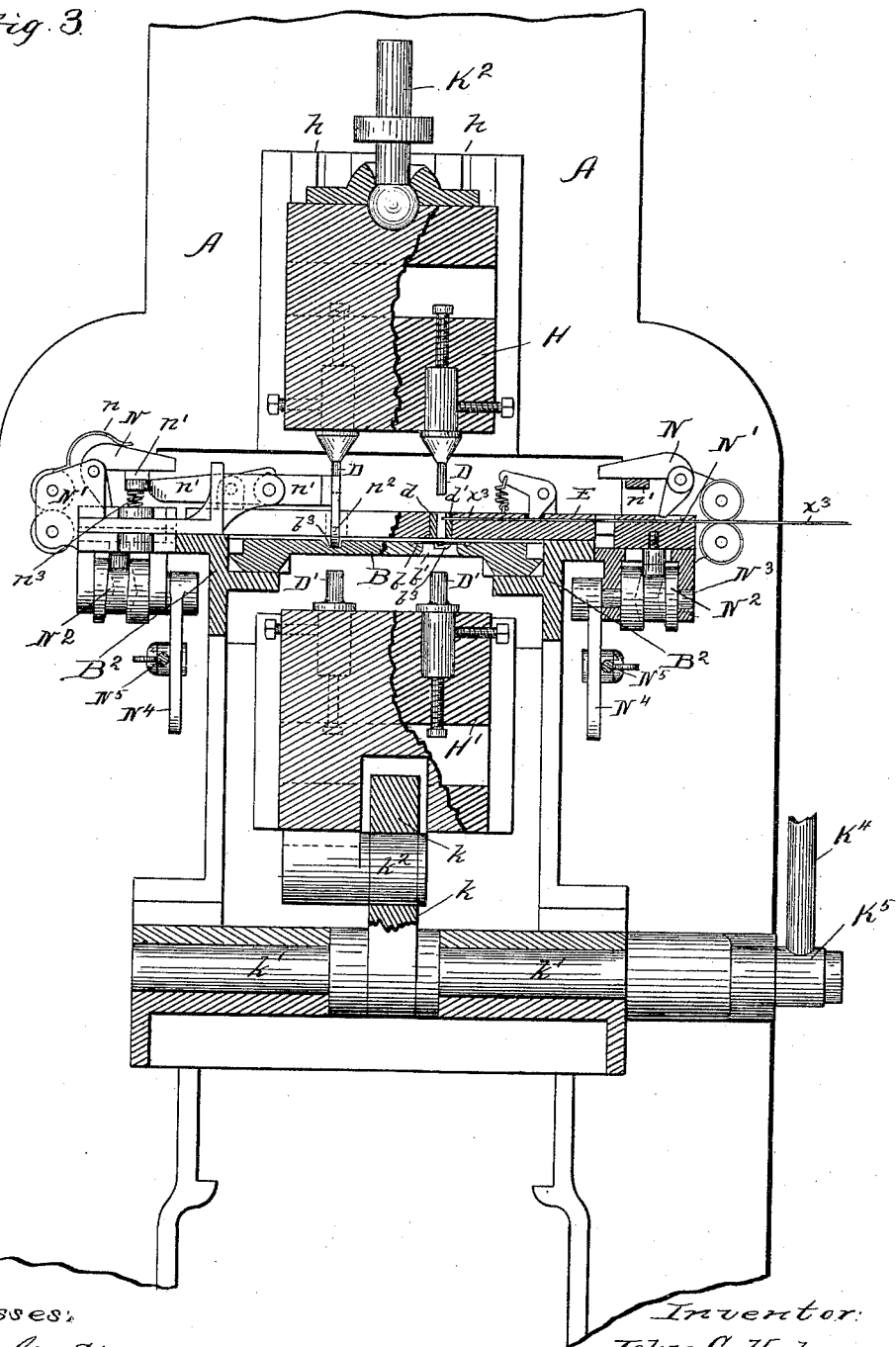

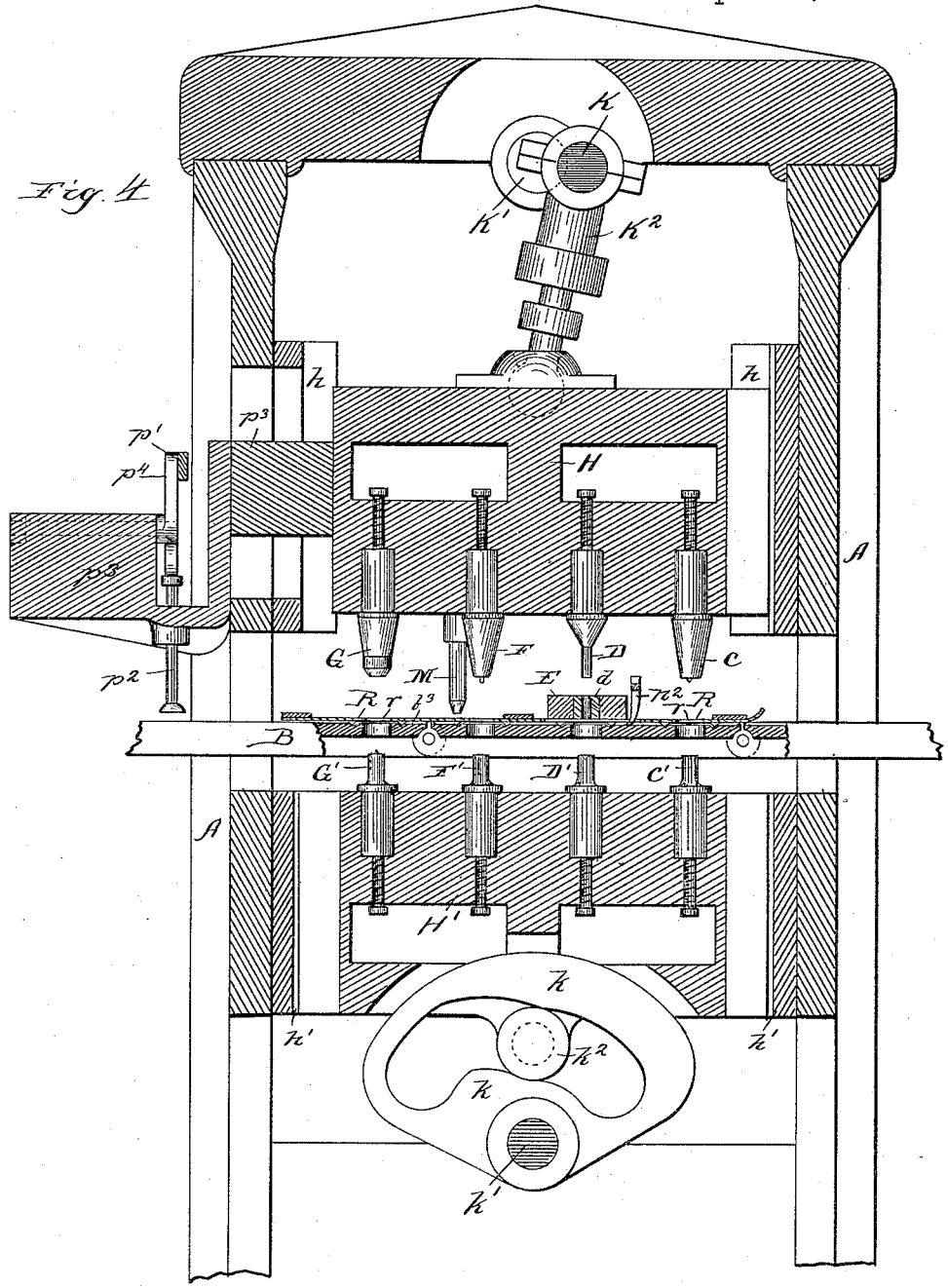

(No Model.) 5 Sheets—Sheet 5.
J. G. HODGSON.
MACHINE FOR SOLDERING VENT HOLES IN CAN CAPS.
No. 436,785. Patented Sept. 23, 1890.
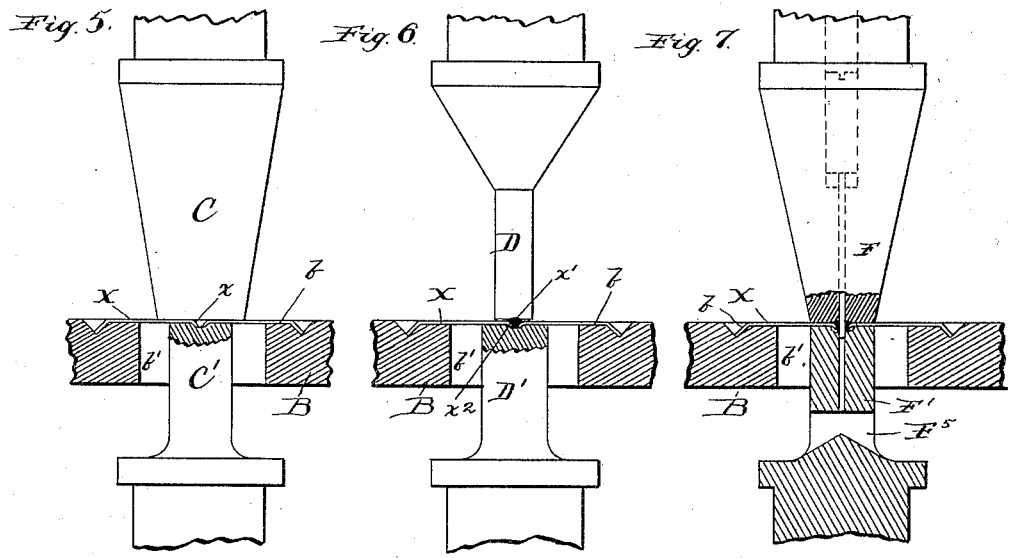
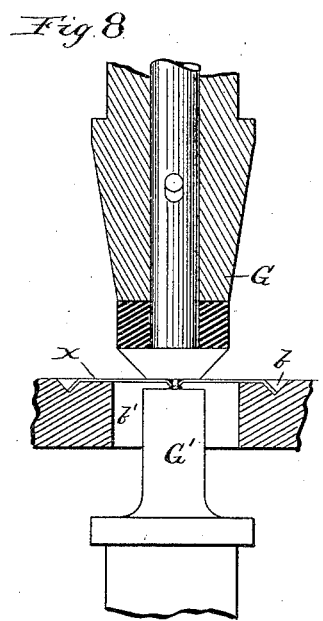
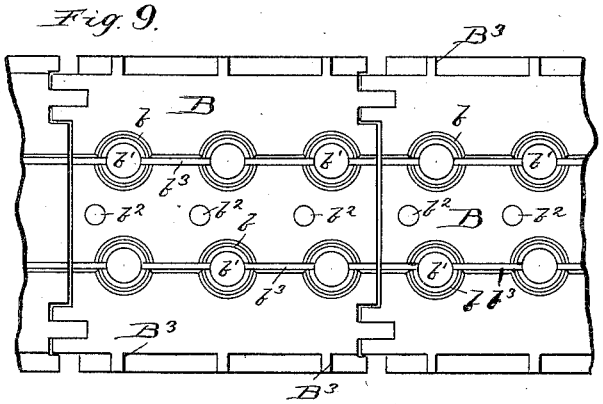
Witnesses:
Lew. C. Curtis
H. W. Munday
Inventor:
John G. Hodgson
By Munday, Evarts & Adcock
His Attorneys.
THE NORRIS PETERS CO., PHOTO-LITHO., WASHINGTON, D. C.

UNITED STATES PATENT OFFICE.

JOHN G. HODGSON, OF MAYWOOD, ILLINOIS, ASSIGNOR TO EDWIN NORTON, OF SAME PLACE, AND OLIVER W. NORTON, OF CHICAGO, ILLINOIS.

MACHINE FOR SOLDERING VENT-HOLES IN CAN-CAPS.

SPECIFICATION forming part of Letters Patent No. 436,785, dated September 23, 1890.

Application filed April 14, 1890. Serial No. 347,855. (No model.)

*To all whom it may concern:*

Be it known that I, JOHN G. HODGSON, a citizen of the United States, residing in Maywood, in the county of Cook and State of Illinois, have invented a new and useful Invention in Machines for Securing Solder to Vent-Holes in Can-Caps, of which the following is a specification.

The object of my invention is to provide a mechanism for rapidly and cheaply applying or securing to can-caps the solder necessary for soldering or closing the vent-holes after the cans have been filled.

In practicing my invention the conical depression in the can-cap surrounding the vent-hole is first filled with solder. A hole is then punched through the solder filling. This punching operation not only serves to open the vent-hole, but to secure the perforated solder filling permanently and rigidly to the can-cap by forming a hollow projection or tube of solder, which projects through the vent-hole opening in the can-cap and engages the walls of such opening. To finish or smooth the under surface of the perforated solder filling, as well as to more securely attach such filling to the cap, I preferably next clinch or rivet the projecting tubular extension of the solder-filling flat upon the surface of the cap.

My invention consists in the novel devices and novel combinations of parts and devices herein shown and described, and more particularly pointed out in the claims.

In the accompanying drawings, which form a part of this specification, and in which similar letters of reference indicate like parts, Figure 1 is a side elevation of a machine embodying my invention. Fig. 2 is a rear end view. Fig. 3 is a vertical section on line 3 3 of Fig. 1. Fig. 4 is a partial vertical longitudinal section taken on line 4 4 of Fig. 3. Figs. 5, 6, 7, and 8 are detail views of the opposing punches or dies which successively operate upon the cap in the operation of the machine. Fig. 9 is a detail plan view of a portion of the flexible or link chain can-cap carrier.

In the drawings, A represents the frame of the machine. B is the can-cap carrier, which operates to feed or advance the can-caps to the successive tools or devices which operate thereon in securing or applying the solder thereto. This can-cap carrier is furnished with a series of sockets or seats $b$ for receiving the can-caps. The can-cap carrier may be of any suitable or well-known construction; but I prefer to employ a link-chain carrier consisting of an endless series of hinged links or sections.

B' B' are the polygon sprocket-wheels or pulleys upon which the carrier is mounted.

$B^2$ is the guide or way on the frame of the machine for the carrier. The seats $b$ for the can-caps on the carrier B are furnished with central holes or perforations $b'$, through which the lower punch or die projects to properly support the can-cap and to relieve the carrier from the thrust or pressure of the upper or opposing punch or die. Each separate link of the carrier B is further furnished with a registering hole or device $b^2$, adapted to engage a countering registering pin or device on the cross-head by which the upper punches are carried, so as to bring the carrier into proper register with the punches. The carrier B is further provided with projections $B^3$, which are engaged by a pawl for communicating a step-by-step movement to the carrier.

C C' are a pair of opposing punches or dies, which serve to clear, finish, or form the vent-hole openings $x$ in the can-cap X. The vent-hole openings $x$ are ordinarily formed at the time the can-caps are cut and stamped to shape; but in practice the vent-hole openings will not always be formed perfectly and uniformly, and for this reason I provide my vent-solder-applying machine with the punches C and C'.

D and D' are a pair of opposing punches or dies, which operate to stamp or press the plug of solder $x'$ into the conical cavity or depression $x^2$ in the can-cap surrounding the vent-hole $x$. The upper punch D also serves or may preferably serve to sever the solder-plug $x'$ from the solder-wire $x^3$ as the same is fed through the guide E. A sleeve $d$, mounted in the guide-block E and having a perforation $d'$, through which the solder-wire is fed, serves as an opposing knife in severing the solder-plug from the solder-wire. This tube or sleeve $d$ also serves as a guide to direct the solder-plug into the vent-hole cavity or depression in the can-cap. The tubular guide $d$ is preferably, for convenience of construction, made in a separate piece from the wire-feed guide-block E.

F and F' are a pair of opposing punches or dies, which serve to perforate or punch a hole through the solder filling after it has been stamped or pressed into the cavity of the can-cap.

G and G' are a pair of opposing punches or dies, which operate to clinch or rivet the projecting tubular extension of the solder filling formed by the stamping-dies D D' and the punching-dies F and F', so as to securely attach the perforated solder filling to the cap.

The upper series of punches C, D, F, and G are secured to and carried by a reciprocating cross-head H, which moves up and down in suitable guides $h$ on the frame of the machine. The lower set of punches or dies C' D' F' G' are secured to and carried by an opposing reciprocating cross-head H', which moves in the guides or ways $h'$ on the frame of the machine. The cross-head H is reciprocated by a crank K on the shaft K' through the connecting-link $K^2$. The cross-head H' is reciprocated by a cam $k$ on the shaft $k'$ through the connecting pin or roller $k^2$. The feed of the solder-wire to the cutting-punch D may be effected by any suitable means known to those skilled in the art. I prefer to employ a clamping dog or lever N in connection with a reciprocating feed-slide N', which is moved back and forth by a cam $N^2$ on the shaft $N^3$. The clamp or dog N is operated to clamp and feed the solder-wire when the feed-slide N' makes its forward movement by a spring $n$. This spring, however, is not permitted to actuate the wire-clamp N unless a cap is in place on the carrier, as a lever $n'$, carrying a pin $n^2$ on its end, holds the clamp N in its open position unless the outer end of the lever $n'$ is moved or depressed by the pin $n^2$ coming in contact with the can-cap on the carrier.

The can-cap carrier B is furnished with a notch or depression $b^3$ to receive the pin $n^2$, and thus prevent the lever $n'$ from being moved unless the can-cap is in place. By this means it will be observed that the solder will not be fed forward unless there is a cap in place in the carrier to receive the charge of solder, as the feeding of the solder is automatically determined or regulated by the presence or absence of the cap in the carrier. One of the cross-heads, preferably the upper one, is furnished with a registering pin or device M, which engages the registering socket or device $b^2$ in the can-carrier B. One of these registering devices $b^2$ M, and preferably the upper one M, should be made tapering or conical to facilitate their engagement with each other.

The carrier B is preferably provided with two lines or series of can-cap seats $b$, and the cross-heads H and H' are correspondingly provided with two series or lines of punches C C', D D', F F', and G G'. By this means I double the capacity of the machine without materially increasing the cost of construction.

P P are counting or registering devices. These are or may be of any ordinary construction now commonly in use or found in the market. For each line or set of punches I provide two of these counting or registering devices and combine them both with the can-cap carrier and the operating mechanism, so that in case one of the registering-boxes should get out of order or fail to operate the other will register or indicate the number of caps delivered. By this means I save much trouble and inconvenience. The operating-arms $p$ of the registering devices P P are connected to a common operating-bar $p'$. Motion is communicated to the common operating-bar $p'$, in case a cap is in place on the carrier, by a reciprocating pin $p^2$, mounted on a projection $p^3$, secured to the cross-head H, which pin $p^2$ engages a lever $p^4$, connected at one end to the operating-bar $p'$, so that the pair of counters connected to the operating-bar $p'$ will be actuated if there is a cap on the carrier, and otherwise not. The cam-shaft $k'$ is operated from the driving-shaft K' by means of a crank $K^3$, connecting-rod $K^4$, and lever-arm $K^5$ on the shaft $k'$. The lever $n'$, carrying the pin or shoe $n^2$, is normally held up, so as to force the pin $n^2$ down, by means of a coil-spring $n^3$ under the outer end of the lever $n'$. The cam $N^2$, which reciprocates the feed-slide N', is rocked by means of a slotted arm $N^4$ on the cam-shaft, which is connected by a link $N^5$ with the bent lever $B^4$, which operates the carrier B. The bent lever $B^4$ carries a pawl $B^5$, which engages the notches $B^3$ on the carrier. This lever $B^4$ is operated by a crank $B^6$ on the driving-shaft K' through the connecting-link $B^7$.

In line with the punches C D F G the frame is furnished with a stripper-plate R, having perforations or holes $r$ therein, through which the several punches act. This stripper-plate serves not only to hold the can-caps in place on the link-chain carrier, but also to strip the caps from the punches C D F G when the same are withdrawn.

The pin or shoe $n^2$ is made of a cam or shoe shape, so as to readily ride over the caps when in place on the carrier.

The opposing punch or die F', which acts in conjunction with the perforating-punch F, has a slot or opening $F^5$ for the discharge of the punchings. This opening $F^5$ has an inclined shelf or base for the better discharge of the material punched out by the punch F.

The carrier for the can-cap or the seats on the carrier are furnished with slots $b^3$ or depressions, into which the pin or shoe $n^2$ may project when no cap is in place.

I claim—

1. The combination, with a can-cap carrier, of a pair of punches or dies for stamping or pressing the solder filling in the cavity of the can-cap and a pair of punches or dies for perforating the solder filling, thus securing the same in place, substantially as specified.

2. The combination, with a pair of punches or dies for perforating the solder filling, of a pair of punches or dies for clinching or riveting the perforated solder filling to the cap, substantially as specified.

3. The combination, with a can-cap carrier, of a solder-wire-feed guide and a punch and opposing knife or die for severing a measured plug or quantity of solder, substantially as specified.

4. The combination, with a can-cap carrier, of a solder-wire-feed guide, a punch for severing a measured plug or quantity of solder, and a tube or device for guiding the severed solder plug into the cavity of the can-cap, said punch reciprocating in said tube or device for guiding the severed plug, substantially as specified.

5. The combination, with a movable carrier B, of a pair of opposing dies and a pair of registering devices for causing the carrier to register with the dies, substantially as specified.

6. The combination, with a can-cap carrier B, having seats b for the can-caps, furnished with central perforations or openings, of a pair of opposing punches or dies operating through the opening in the carrier, substantially as specified.

7. The combination, with a can-cap carrier, of a solder-feed device, a pair of opposing dies for pressing the solder filling into the cavity of the can-cap, and a pair of opposing dies for perforating the solder filling, substantially as specified.

8. The combination, with a can-cap carrier, of a solder-feed device, a pair of opposing dies for pressing the solder filling into the cavity of the can-cap, a pair of opposing dies for perforating the solder filling, and a pair of clinching or riveting dies, substantially as specified.

9. The combination, with a movable carrier, of two registering or counting devices connected with a common operating mechanism, substantially as specified.

10. The process or method of attaching solder in the vent-cavities of can-caps, consisting in first filling the vent-cavity with the requisite quantity of solder and then punching a hole through the solder filling and thus opening the vent through the solder, substantially as specified.

11. The combination, with means for applying solder to the vent cavity of a can-cap, of a device for perforating the solder, substantially as specified.

12. The combination, with means for applying solder to the vent-cavity of a can-cap, of a device for perforating the solder and means for clinching or riveting the perforated solder filling to the cap, substantially as specified.

13. The combination, with a can-cap carrier, of a pair of vent-opener punches or dies and a pair of solder-stamping punches or dies, substantially as specified.

14. The combination, with a can-cap carrier, of a pair of vent-opener punches or dies, a pair of solder-stamping punches or dies, and a pair of perforating punches or dies, substantially as specified.

15. The combination, with a can-cap carrier, of a pair of vent-opener punches or dies, a pair of solder-stamping punches or dies, a pair of perforating punches or dies, and a pair of clinching punches or dies, substantially as specified.

16. The combination, with a can-cap carrier, of a pair of vent-opener punches or dies, a pair of solder-stamping punches or dies, and a solder-feed device, substantially as specified.

17. The combination, with a wire-solder-feed device, of a can-cap carrier and mechanism for controlling the action of said feed device by the presence or absence of a can-cap on said carrier, substantially as specified.

18. The combination, with a wire-solder-feed device, of a can-cap carrier and mechanism for controlling the action of said feed device by the presence or absence of a can-cap on said carrier, said carrier having a depression in the can-cap seat operating to arrest the solder-feed mechanism, substantially as specified.

19. The combination, with a solder-wire-feed slide having a feed-clamp, of a carrier, a reciprocating cross-head, a sliding pin carried thereby, and mechanism connecting said pin and said feed-clamp, substantially as specified.

20. The combination, with a carrier having seats b for the can-caps, of a pair of opposing dies for stamping or pressing the solder into the vent-holes of the can-cap, substantially as specified.

21. The combination, with a can-cap carrier, of a solder-feed device and a pair of opposing stamping-dies, substantially as specified.

22. The combination, with a can-cap carrier having can-cap seats with central perforations through the same, of a pair of punches or dies for perforating the solder filling, substantially as specified.

23. The combination, with a series of opposing punches or dies, of a carrier and a stripper-plate, substantially as specified.

24. The combination, with a carrier having seats thereon for holding the blanks to be operated upon, of a pair of opposing dies or punches and a stripper-plate, substantially as specified.

JOHN G. HODGSON.

Witnesses:
 H. M. MUNDAY,
 EMMA HACK.